United States Patent [19]

Martin

[11] 4,041,495
[45] Aug. 9, 1977

[54] APPARATUS FOR DETERMINING THE POSITION OF A OBJECT

[75] Inventor: David James Reginald Martin, Leatherhead, England

[73] Assignee: Coal Industry (Patents) Limited, London, England

[21] Appl. No.: 610,393

[22] Filed: Sept. 4, 1975

[30] Foreign Application Priority Data

Oct. 4, 1974 United Kingdom ............... 43129/74

[51] Int. Cl.$^2$ .......................... G01S 3/02; G08B 21/00
[52] U.S. Cl. ................. 343/112 R; 340/21; 340/282
[58] Field of Search ...................... 343/112 D, 112 R; 340/21, 282

[56] References Cited

U.S. PATENT DOCUMENTS

| 1,562,485 | 11/1925 | Affel ................................. 343/105 R |
| 3,128,070 | 4/1964 | Harris, Jr. et al. ................... 340/282 |
| 3,900,878 | 8/1975 | Tsao ..................................... 343/225 |

*Primary Examiner*—Maynard R. Wilbur
*Assistant Examiner*—T. M. Blum
*Attorney, Agent, or Firm*—James C. Wray

[57] ABSTRACT

The position of an object which moves along a fixed path is determined by measuring the phase displacement of two signals received from demodulators connected to an aerial located along the path. A transmitter carried by the objects feeds signals to the demodulators and one of these sends a demodulated signal direct to a comparator while the other sends its signal to the comparator along the aerial.

10 Claims, 1 Drawing Figure

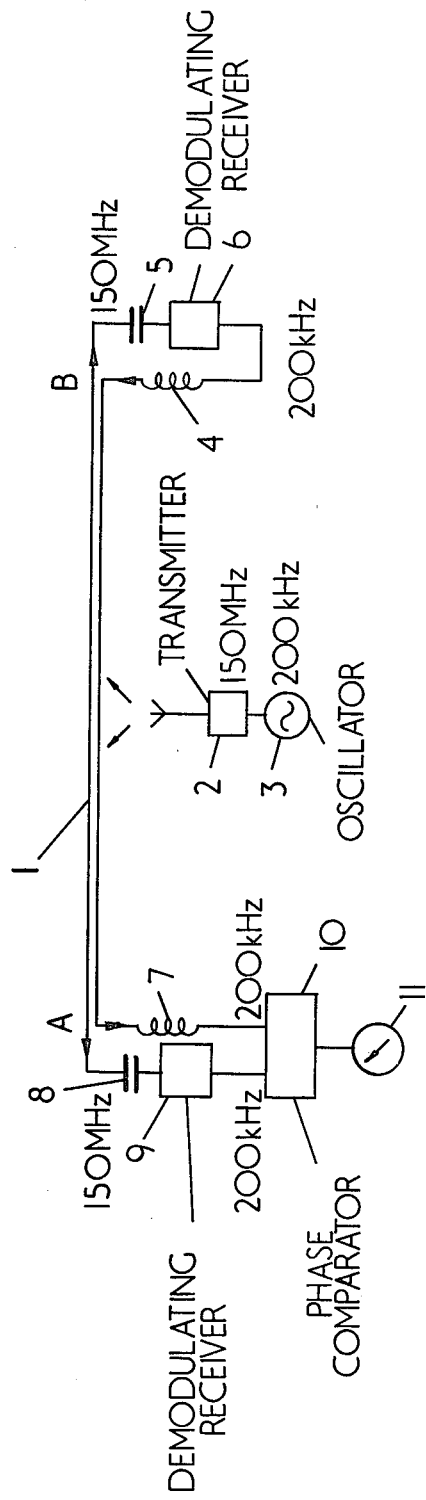

APPARATUS FOR DETERMINING THE POSITION OF AN OBJECT

This invention relates to apparatus for determining the position of an object along a fixed path and also to a method for determining the position of the object.

In many industrial applications, objects are constrained to move along a fixed path which may be a very substantial length. The path may not always be easily visible, and it is often necessary to be able to determine the exact position of the object at any one time.

Such applications could include the movement of wagons along railway lines, items being manufactured on long conveyor lines, objects being conveyed on belts in warehouses, and particularly to coal cutting machinery moving along the coal face, and to a lift cage moving in a lift shaft.

Proposals have been made for indexing systems which generate pulses to a pulse counter as the object is moved, and the number of pulses counted can be used to give an indication of the location of the object. Such systems are not necessarily accurate since slippage can occur, and, therefore, erroneous readings obtained.

It is an object of the present invention to provide an apparatus and a method whereby the position of an object along a fixed path can positively and accurately be determined at any time.

According to a first aspect of the present invention apparatus for determining the position of an object along a fixed path comprises a radiating transmitting type receiving aerial line in or adjacent to the path, a transmitter associated with the object and movable therewith, first demodulating means connected with one end of the line and arranged to feed a demodulated signal into the line, second demodulating means connected to the other end of the line, and phase comparator means connected to the said other end of the line and connected to receive demodulated signals from both demodulating means and further arranged to determine the phase difference between the signals received.

The transmitter is preferably arranged to transmit at a very high radio frequency and the demodulated signals are arranged to be transmitted at a relatively lower radio frequency. Conveniently, the demodulated signal wave length is such as to act as a carrier for the RF wave lengths. The RF wave length may be in MHz, preferably between 30 to 500 MHz.

The comparator may have indicating means connected to it which is adapted to give a direct reading of the distance of the object from one of the ends of the path. The comparator preferably measures phase displacements not in excess of 180°.

The radiating transmitting line may be an open braid coaxial cable, or any type of cable known as a leaky feeder. Such cable is well known for use in selected transmission applications where it is used as a transmitting and receiving aerial. Alternatively the line could be a twin conductor line.

According to a second aspect of the present invention, a method for determining the position of an object along a path comprises arranging a radiating transmission line along the path and connecting first and second demodulating means respectively to the ends of the path, transmitting from the object to the path an RF signal to the line, receiving the RF signal at the first demodulating means at one end of the line, demodulating it and feeding a first demodulated signal over the line to comparator means connected to the other end of the line, receiving the said RF signal at the second demodulating means and feeding a second demodulated signal to the comparator means, and comparing in the comparator means the phase difference of the said demodulated signals and determining therefrom a measure of the distance of the object along the path.

The transmitter may be arranged to operate continuously or intermittently.

In order that the invention may be readily understood one example of apparatus incorporating the invention and using the method thereof will now be described by way of example only with reference to the schematic drawing accompanying this specification. The drawing indicates an aerial which is arranged along a coal face of 250 meters length, which is traversed by a coal-cutting machine. The machine carries a transmitter and an electrical supply to the transmitter is derived from the normal supply to the machine.

A leaky feeder or a twin transmission line 1 runs the full length of the coal face or other track of the vehicle or machine between points A and B shown. In this example, the line takes the form of a coaxial cable of the type having a braided outer conductor in which the weave of the braid has been made open to give a reduced optical braid cover, for example, 67%. Alternatively, the line may comprise one of the various other types of known coaxial cable used in leaky feeder radio systems.

A transmitter 2 is attached to the coal-cutting machine and operates either continuously or as required to emit a signal at a carrier frequency of 150 MHz modulated at a frequency of 200 KHz by an oscillator 3. The signal is received into the nearby leaky feeder type receiving aerial line 1 and conducted to each end of it, at A and B. It should be appreciated that the free air transmission of radio signals of this carrier frequency along a coal face if very poor, so that signals received at the two ends of the feeder line can confidently be assumed to have entered it in the very near vicinity of the transmitter. The relative phase of the signals received at A and B are thus determined almost entirely by the transmission times within the leaky feeder line itself. These times, in turn, are determined solely by the phase velocity of the leaky feeder line and the relative distances between the transmitter and the ends A and B. The phase velocity of the leaky feeder line is very substantially constant, being dependent only on the construction of the feeder independent of its surroundings; a typical leaky feeder line used in this application would have a dielectric consisting of solid polythene, in which case the phase velocity would be 0.67 times the velocity of light in vacuo. Therefore, the time and phase differences between signals received at A and B from the transmitter are in particular not affected by continual multipath propagation effects and stray reflections to which a freely propagating wave not conducted by the leaky feeder line would be subject. These time and phase differences can thus be taken as an accurate measure of the position of the transmitter on the coal face.

A radio-frequency choke 4 is connected to the end B of the line 1 and blocks the signal from 2; this signal, however, passes through a capacitor 5 and is demodulated in a receiver 6. The demodulated signal at 200 KHz passes through radio-frequency choke 4 back into the leaky feeder line 1 at B to be conducted to end A, where it is passed by a radio-frequency choke 7 to a phase-comparator 10. The signal from the transmitter 2 is also received at end A and is blocked by the radio-frequency choke 7 but passed by a capacitor 8 to a receiver 9 where it is demodulated and passed as a 200 KHz signal to phase-comparator 10.

The phase-comparator 10 thus receives two signals at 200 KHz, one of which has travelled from the transmitter 2 to end B and then the full length of the leaky feeder to end A, and the other of which has travelled directly from the transmitter to end A. The phase difference between the two signals received by the phase-comparator 10 is thus a direct indication of the travelling times of the two signals and therefore of the distance of the transmitter from end B. It is of no consequence in this indication that the signal via end B has travelled part of the overall distance as a very-high frequency signal modulated at 200 KHz and part as a 200 KHz signal, while the direct signal from transmitter 2 to end A has travelled entirely as a very high frequency signal modulated at 200 KHz, since the phase velocity of propagation is the same for all radio frequencies. It is arranged that receivers 6 and 9 and their associated circuits are identical so that any additional time delays or phase differences introduced by them will cancel out.

At the typical modulation frequency taken of 200 KHz a phase difference varying from zero to 180°, that is, from in-phase to antiphase, would correspond to a time difference varying from zero to 1 μs. Using the typical figure of 0.67 as the velocity ratio of the feeder, this would, in turn, correspond to a path difference varying between zero and 500 meters, which would result from the distance between the transmitter and end B varying between zero and 250 meters.

A phase-comparator to measure such phase variation between zero and 180° may be designed and constructed according to known principles and arranged, for example, to indicate the measurement on a meter 11. Such an indicator may be calibrated directly in terms of distance, and so in the case being considered a full-scale reading would correspond to a distance between the transmitter and end B equal to 250 meters. The typical parameters for a system as given in this example would thus be suitable for indicating the position of a cutting machine on a coal face which did not exceed 250 meters in length.

If the chosen modulation frequency should be too high in relation to the distance over which it is desired the system shall measure, then the phase difference will exceed 180° at certain positions of the transmitter and an ambiguity of position will arise in the indication. This assumes that the phase comparator is of the type which cannot sense the polarity of the difference in phase being indicated if the polarity can be resolved then distances corresponding to a phase difference of 360° may be used without ambiguity, the ambiguity then arising at greater phase differences than 360°, and the system parameters may be adjusted accordingly.

On the other hand, the use of a high modulation frequency is advantageous in that the sensitivity and accuracy of indication of the phase comparator is improved. The chosen modulation frequency should therefore preferably be no lower than is necessary to avoid ambiguity.

Where the highest accuracy of indication is required, it is advantageous to include means for switching the modulation frequency between a suitable lower frequency and a suitable higher frequency; the higher frequency is used for best accuracy of indication, and the lower frequency is used to provide a less precise indication to resolve the ambiguity introduced by the higher frequency.

The carrier frequency, which in the example described is 150 MHz, may be any radio frequency in the range over which leaky feeder radio communication systems are effective, that is, within the range 30 to 500 MHz. It is an advantage if the free radio propagation at the chosen carrier frequency in the environment concerned is poorest, so that the transmission of signals is substantially through the leaky feeder.

The circuits chosen for the receivers and the transmitter may all be of conventional design with appropriate component values selected according to the frequency of the installation selected.

I claim:

1. Apparatus for determining the position of an object along a fixed path in which the apparatus includes a receiving aerial line in or adjacent the path, a transmitter associated with the object and movable therewith, first demodulating means connected to one end of the line and arranged to feed a demodulated signal into the line, second demodulating means connected to the other end of the line, and phase comparator means connected to the said other end of the line to receive demodulated signals from the first demodulating means and also connected to receive demodulated signals form the second demodulating means, the demodulating means and phase comparator means being responsive to transmitter signals and further adapted to determine the phase difference of the demodulated signals received and to give an output signal indicative of the phase difference, which is related to position of an object.

2. Apparatus as claimed in claim 1 and including indicating means connected to the phase comparator for receiving the said output signal.

3. Apparatus as claimed in claim 2 in which the phase comparator is adapted only to measure phase displacements in the range 0° to 180°.

4. Apparatus as claimed in claim 1 in which the line is of a coaxial type having an open outer conductor allowing signals to pass through it to the inner conductor.

5. A method for determining the position of an object along a path in which a radiating transmission line is arranged along the path and first and second demodulating means are connected respectively to first and second ends of the line, transmitting an r.f. signal to the line from apparatus associated and movable with the object, receiving the r.f. signal at the first demodulating means at the first end of the line, demodulating the r.f. signal and transmtting the demodulated signal over the line to a comparator means at the second end of the line, receiving the r.f. signal over the line at the second end demodulating means at the second end of the line, demodulating the r.f. signal by said second demodulating means, feeding the demodulated signal from the second demodulating means, to the comparator means in which it is compared in phase with the signal from the first demodulating means and an output signal related to the distance of the object along the path is produced.

6. A method as claimed in claim 5 in which the frequency of the r.f. signal transmitted to the line is higher then the frequencies of the demodulated signal in the line.

7. A method as claimed in claim 6 in which the wave length of the demodulated signals is such as to be suitable to act as a carrier wave for the r.f. signals from the transmitter.

8. A method as claimed in claim 5 to which the transmitter operates at a frequency in the range 30 to 500 MHz.

9. The apparatus of claim 1 wherein the receiving aerial line is a twin transmission line and further comprising first and second radio frequency chokes respectively connected to opposite ends of a first one of the twin transmission line, and first and second radio frequency passing capacitors connected to respective ends of a second of the twin transmission line and wherein the first and second demodulating means are respectively connected to the first and second capacitors, wherein the first choke is connected to the first demodulating means and wherein the phased comparator means is connected to the second choke and to the second demodulating means.

10. The apparatus of claim 9 further comprising a meter connected to the phase comparator means for indicating the position of an object along the fixed path.

* * * * *